US009292641B2

(12) United States Patent
Cao (10) Patent No.: US 9,292,641 B2
(45) Date of Patent: Mar. 22, 2016

(54) TIMING BOTTLENECK ANALYSIS ACROSS PIPELINES TO GUIDE OPTIMIZATION WITH USEFUL SKEW

(71) Applicant: Synopsys, Inc., Mountain View, CA (US)

(72) Inventor: Aiqun Cao, Sunnyvale, CA (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 14/141,280

(22) Filed: Dec. 26, 2013

(65) Prior Publication Data

US 2014/0181779 A1  Jun. 26, 2014

Related U.S. Application Data

(60) Provisional application No. 61/746,067, filed on Dec. 26, 2012.

(51) Int. Cl.
*G06F 17/50* (2006.01)

(52) U.S. Cl.
CPC .......... *G06F 17/505* (2013.01); *G06F 2217/84* (2013.01)

(58) Field of Classification Search
CPC .................. G06F 17/5031; G06F 2217/84
USPC ................ 716/100, 108, 113, 132, 134
See application file for complete search history.

(56) References Cited

U.S. PATENT DOCUMENTS

| 6,550,045 | B1* | 4/2003 | Lu et al. ................... 716/114 |
| 7,559,040 | B1 | 7/2009 | Albrecht et al. |
| 7,694,242 | B1* | 4/2010 | Li et al. .................... 716/100 |
| 8,255,860 | B1 | 8/2012 | Fung |
| 8,539,413 | B1* | 9/2013 | Singla et al. ................... 716/113 |
| 2005/0066297 | A1* | 3/2005 | Kalafala ............. G06F 17/5031 716/108 |
| 2005/0268263 | A1* | 12/2005 | Sun ...................... G06F 17/5031 716/114 |
| 2006/0064658 | A1* | 3/2006 | Minonne et al. ................... 716/6 |
| 2006/0190899 | A1* | 8/2006 | Migatz et al. .................... 716/13 |
| 2007/0226667 | A1* | 9/2007 | Chadwick, Jr. ...... G06F 17/5031 716/113 |
| 2007/0226668 | A1* | 9/2007 | Dasdan et al. ..................... 716/6 |
| 2008/0168412 | A1* | 7/2008 | Cheon et al. ....................... 716/7 |
| 2008/0209372 | A1* | 8/2008 | Buck ................... G06F 17/5031 716/113 |
| 2009/0293033 | A1* | 11/2009 | Ito ........................ G06F 17/5068 716/113 |
| 2010/0268522 | A1* | 10/2010 | Bhanji et al. .................... 703/21 |
| 2011/0283248 | A1 | 11/2011 | Irie |
| 2012/0144362 | A1 | 6/2012 | Fricke et al. |
| 2012/0284680 | A1* | 11/2012 | Iyer et al. ....................... 716/113 |
| 2013/0198701 | A1* | 8/2013 | Platzker et al. ............... 716/102 |
| 2014/0149956 | A1* | 5/2014 | Fluhr ................... G06F 17/5031 716/113 |

OTHER PUBLICATIONS

Cunningham, Paul et al. "Clock Concurrent Optimization" Rethinking Timing Optimization to Target Clocks and Logic at the Same Time, Feb. 2009, Azuro, Inc. 2009, downloaded Jan. 23, 2014, http://www.deepchip.com/downloadpage.html.

* cited by examiner

*Primary Examiner* — Paul Dinh

(74) *Attorney, Agent, or Firm* — Park, Vaughan, Fleming & Dowler LLP; Laxman Sahasrabuddhe (57) ABSTRACT

Techniques and systems for guiding circuit optimization are described. Some embodiments compute a set of aggregate slacks for a set of chains of logic paths in a circuit design. Each chain of logic paths starts from a primary input or a sequential circuit element that only launches a signal but does not capture a signal and ends at a primary output or a sequential circuit element that only captures a signal but does not launch a signal. Next, the embodiments guide circuit optimization of the circuit design based on the set of aggregate slacks.

21 Claims, 4 Drawing Sheets

TIMING BOTTLENECK ANALYSIS ACROSS PIPELINES TO GUIDE OPTIMIZATION WITH USEFUL SKEW

RELATED APPLICATION

This application claims priority to U.S. Provisional Application Ser. No. 61/746,067, by Aiqun Cao, filed on 26 Dec. 2012, the contents of which are herein incorporated by reference in their entirety for all purposes.

BACKGROUND

1. Technical Field

This disclosure relates to electronic design automation (EDA). More specifically, this disclosure relates to circuit design optimization.

2. Related Art

Advances in process technology and a practically unlimited appetite for consumer electronics have fueled a rapid increase in the size and complexity of integrated circuit (IC) designs. Due to the rapidly increasing size and complexity of IC designs, it is becoming increasingly difficult to convert a high-level description of a circuit design into an implementation that meets a set of timing constraints, and at the same time optimizes additional metrics, such as area, leakage power, etc.

SUMMARY

Some embodiments described herein provide techniques and systems for guiding optimization of a circuit design. Some embodiments described herein compute a set of aggregate slacks (also referred to as super path slacks in this disclosure) for a set of chains of logic paths in a circuit design. Each chain of logic paths starts from a primary input or a sequential circuit element that only launches a signal but does not capture a signal and ends at a primary output or a sequential circuit element that only captures a signal but does not launch a signal. Next, the embodiments guide circuit optimization of the circuit design based on the set of aggregate slacks. More specifically, some embodiments guide circuit optimization that is performed before clock tree synthesis (CTS) based on the set of aggregate slacks.

In some embodiments, guiding the circuit optimization of the circuit design involves not attempting to resolve a timing violation of a logic path that is in a chain of logic paths whose aggregate slack is greater than or equal to zero.

In some embodiments, guiding the circuit optimization of the circuit design involves attempting to resolve a timing violation of a logic path that is in a chain of logic paths whose aggregate slack is negative.

In some embodiments, guiding the circuit optimization of the circuit design involves attempting to increase the aggregate slack of a chain of logic paths whose aggregate slack is negative.

In some embodiments, guiding the circuit optimization of the circuit design involves assigning a priority to a logic path based on how many chains of logic paths having negative slack include the logic path, wherein the circuit optimization attempts to increase timing slack of logic paths in decreasing priority order. The logic path that is shared by the greatest number of chains of logic paths (i.e., the greatest number of super paths) with negative slacks can be referred to as the "timing bottleneck."

In some embodiments, guiding the circuit optimization of the circuit design involves terminating circuit optimization when all aggregate slacks in the set of aggregate slacks are greater than or equal to zero.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z.

Overview of an Electronic Design Automation (EDA) Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are for illustrative purposes only and are not intended to limit the embodiments to the forms disclosed.

Some EDA software tools enable circuit designers to describe the functionality of the circuit design. These tools also enable circuit designers to perform what-if planning to refine functionality, check costs, etc. During logic design and functional verification, the HDL (hardware description language), e.g., SystemVerilog, code for modules in the system can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout (placement) and can be electrically coupled (routing).

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Providing Optimization Guidance Based on Super Path Slacks

Figure 1:
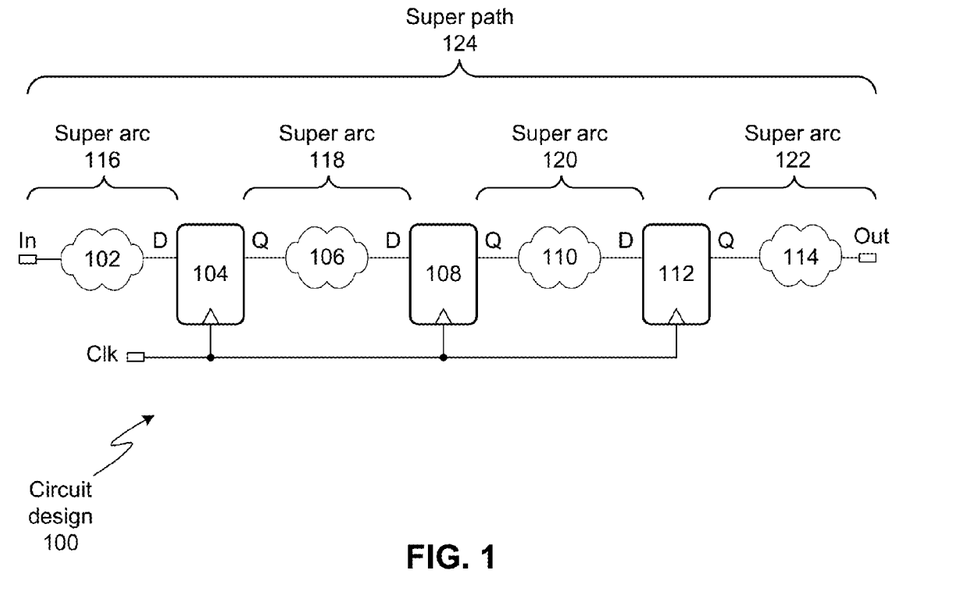
FIG. 1 illustrates a circuit design in accordance with some embodiments described herein.

FIG. 1 illustrates a circuit design in accordance with some embodiments described herein. Circuit design 100 includes sequential circuit elements 104, 108, and 112. Input pin "In" is coupled to combinational logic 102, which is coupled to input pin "D" of sequential circuit element 104. The output pin "Q" of sequential circuit element 104 is coupled to combinational logic 106, which is coupled to input pin "D" of sequential circuit element 108. The output pin "Q" of sequential circuit element 108 is coupled to combinational logic 110, which is coupled to input pin "D" of sequential circuit element 112. The output pin "Q" of sequential circuit element 112 is coupled to combinational logic 114, which is coupled to output pin "Out." The clock inputs of sequential circuit elements 104, 108, and 112 are coupled to clock pin "Clk."

An edge-triggered D flip-flop has been used in this disclosure as an example of a sequential circuit element. However, the term "sequential circuit element" generally refers to any type of edge-triggered or level-triggered sequential circuit element, and is not limited to the forms disclosed in this disclosure. It will be apparent to a person having ordinary skill in the art that the embodiments described in this disclosure are generally applicable to any type of edge-triggered or level-triggered sequential circuit element.

At a given clock edge (either rising, falling, or both), the input of each sequential circuit element captures the logical value that was provided to the input, and the output of each sequential circuit element launches a logical value which then propagates through one or more gates and/or nets before arriving at the input of the next sequential circuit element.

In this disclosure, the term "super arc" refers to a path that starts from a primary input or an output of a sequential circuit element and ends at a primary output or an input of the next sequential circuit element. For example, circuit design 100 includes super arcs 116, 118, 120, and 122. The term "super arc delay" refers to the delay of a super arc. Timing analysis usually computes the delay of a super arc, e.g., the delay from an output of a sequential circuit element to the input of the next sequential circuit element, to ensure that the delay is less than the clock period. For example, a timing analysis system may determine the delay of super arc 120 (i.e., the delay from the output of sequential circuit element 108 to the input of sequential circuit element 112) by adding up the delays of each gate and net in super arc 120. The super arc delay can also include the setup time of sequential circuit element 112.

If we assume that all sequential circuit elements receive a perfectly synchronized clock signal (i.e., the clock edges occur exactly at the same time at all sequential circuit elements) and assume setup constraint is 0, then we can subtract the super arc delay from the clock period to determine the timing slack. However, if the clocks are not synchronized, then we need to take the clock skew into consideration for computing the timing slack. Specifically, the path slack $S_P$ between one sequential circuit element (e.g., sequential circuit element 108) and the next sequential circuit element (e.g., sequential circuit element 112) can be computed as follows:

$$S_P = T + L_L - D - L_C, \quad (1)$$

where T is the clock period, $L_L$ is the launch clock latency (i.e., the time difference between an "ideal" clock edge and the actual clock edge at the launching sequential circuit element), D is the super arc delay, and $L_C$ is the capture clock latency (i.e., the time difference between an "ideal" clock edge at the clock root and the actual clock edge at the capturing sequential circuit element).

If the path slack $S_P$ is positive then that means that the signal that was launched at the launching sequential circuit element (e.g., sequential circuit element 108 in the above example) will arrive before the required time at the capturing sequential circuit element (e.g., sequential circuit element 112 in the above example). However, if the path slack $S_P$ is negative (i.e., there is a timing violation) then that means that the signal that was launched at the launching sequential circuit element will arrive later the required time at the capturing sequential circuit element, which may cause circuit design 100 to malfunction. (Some embodiments may consider a small positive path slack to also be violating. In these embodiments, a threshold term can be added to Equation (1) to represent the boundary between violating timing slack values and non-violating timing slack values.)

When the path slack is negative, the circuit design needs to be modified to make the path slack greater than or equal to zero. For example, conventional circuit optimization systems try to improve the path slack by reducing the value of D in Equation (1) by performing various circuit transformations, e.g., adding/removing buffers, increasing/decreasing the gate sizes, replacing a portion of a circuit with an equivalent circuit that has a lower delay, etc. However, note that another approach for improving the timing slack value is to modify the values of $L_L$ and/or $L_C$, i.e., modify the relative clock skew between the launching and capturing sequential circuit elements. In this disclosure, when a clock skew is introduced into a circuit design to improve timing of one or more timing paths, the clock skew is referred to as a "useful clock skew."

The term "logic path" refers to a path that starts at a primary input or an output of a sequential circuit element and ends at a primary output or an input of another sequential circuit element. For example, the path that starts at output "Q" of sequential circuit element 104 and ends at input "D" of sequential circuit element 108 is a logic path. The term "super path" refers to a chain of logic paths that starts from a primary input or a sequential circuit element that only launches a signal but does not capture a signal (such sequential circuit elements are rare) and ends at a primary output or a sequential circuit element that only captures a signal but does not launch a signal (again, such sequential circuit elements are rare). In other words, a super path is a chain of super arcs that begins at a primary input or a sequential circuit element that only launches a signal but does not capture a signal (such sequential circuit elements are rare) and ends at a primary output or a sequential circuit element that only captures a signal but does not launch a signal (again, such sequential circuit elements are rare). For example, super path 124 begins at primary input "In" and ends at primary output "Out" and includes the chain of super arcs 116, 118, 120, and 122.

The term "super path slack" refers to the summation of the individual path slacks (e.g., computed using Equation (1)) along the super path.

Note that the launch clock latency and the capture clock latency cancel each other out for all sequential circuit elements on the super path.

Therefore, the super path slack $S_{SP}$ for a super path that is a chain of n super arcs can be expressed as follows:

$$S_{SP} = \sum_{i=1}^{n} S_P^i = n \cdot T - \sum_{i=1}^{n} D^i, \qquad (2)$$

where $S_P^i$ is the path slack for the $i^{th}$ path in the super path, T is the clock period, and $D^i$ is the $i^{th}$ super arc delay.

If the super path slack is non-negative (i.e., it is greater than or equal to zero), then the timing violations of the paths in the super path can be resolved by introducing useful clock skew in the violating paths, i.e., by modifying the relative clock skew between the launch and capture sequential circuit elements in the violating path.

For example, let us assume that all sequential circuit elements in FIG. 1 receive an ideal clock signal and the path slacks are as follows: the path slack $S_P^1$ from input pin "In" to the "D" pin of sequential circuit element 104 is equal to 0 time units, the path slack $S_P^2$ from the "Q" pin of sequential circuit element 104 to the "D" pin of sequential circuit element 108 is equal to −2 time units, the path slack $S_P^3$ from the "Q" pin of sequential circuit element 108 to the "D" pin of sequential circuit element 112 is equal to +2 time units, and the path slack $S_P^4$ from the "Q" pin of sequential circuit element 112 to the output pin "Out" is equal to 0 time units. Note that the super path slack is equal to 0 (i.e., $S_P^1+S_P^2+S_P^3+S_P^4=0$). The timing violation in the second path can be resolved by delaying the clock signal to the sequential circuit element 108 by 2 time units (i.e., delayed with respect to the ideal clock signal). After the clock signal has been delayed in this fashion, all of the path slacks will be equal to 0.

If the super path slack is negative (e.g., if $S_P^1+S_P^2+S_P^3+S_P^4<0$ in the above example), then the timing violations of the paths in the super path cannot be resolved by only introducing useful clock skew. Some embodiments described herein use super path slacks to guide timing optimization of the circuit design. Specifically, circuit optimization that is performed before CTS can target timing violations on super paths that have negative slacks instead of fixing all paths with negative slacks based on ideal clock timing. Once pre-CTS circuit optimization completes, all super path slacks will hopefully be greater than equal to zero. Then, CTS can resolve any remaining timing violations on super paths with zero or positive slacks by introducing useful clock skew, e.g., by introducing delays at appropriate locations in the clock tree.

For super paths with negative slacks, pre-CTS optimization generally has freedom to decide which component path to optimize to reduce the super arc delay. However, in some embodiments, the timing paths (irrespective of their slacks) can be prioritized based on how many negative slack super paths share a given timing path. Specifically, a timing path that is shared by more super paths with negative slacks should be optimized first. If the slack of a high priority timing path is already positive, then some embodiments instruct the pre-CTS circuit optimization to further increase the positive slack of the timing path. Note that this is non-obvious because pre-CTS circuit optimization normally would not try to increase the positive slack of a timing path.

Figure 2:
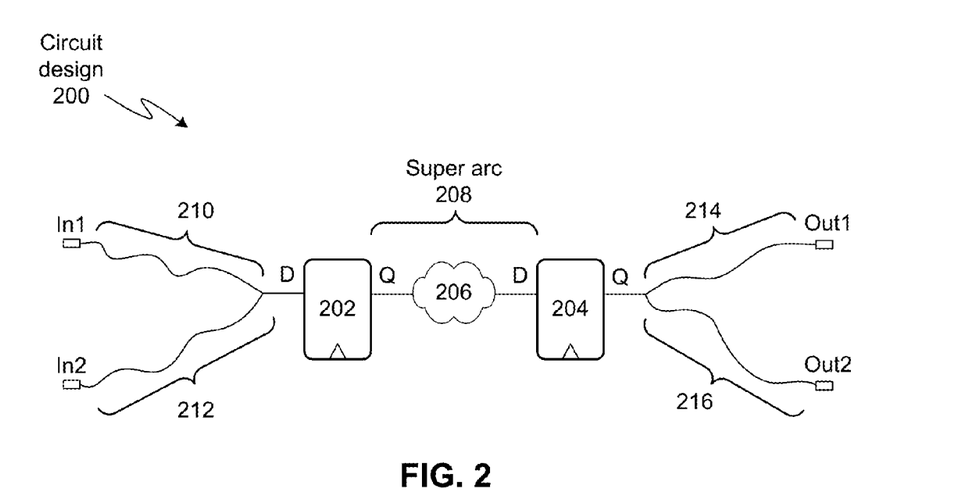
FIG. 2 illustrates how guidance can be provided based on super path analysis in accordance with some embodiments described herein.

FIG. 2 illustrates how guidance can be provided based on super path analysis in accordance with some embodiments described herein. Circuit design 200 includes sequential circuit elements 202 and 204. Super arc 208 begins at the "Q" output of sequential circuit element 202 and ends at the "D" input of sequential circuit element 204. Circuit path 210 begins at primary input "In1" and ends at the "D" input of sequential circuit element 202, and circuit path 212 begins at primary input "In2" and also ends at the "D" input of sequential circuit element 202. Circuit paths 210 and 212 may include combinational and/or sequential circuit elements, and may share one or more circuit elements. Likewise, circuit path 214 begins at the "Q" output of sequential circuit element 204 and ends at primary output "Out1," and circuit path 216 begins at the "Q" output of sequential circuit element 204 and ends at primary output "Out2". Circuit paths 214 and 216 may include combinational and/or sequential circuit elements, and may share one or more circuit elements.

Let us assume that the super path that begins at primary input "In1" and ends at primary output "Out1" has a negative slack, and the super path that begins at primary input "In2" and ends at primary output "Out2" also has a negative slack. Then, since both the super paths with negative slack pass through super arc 208, some embodiments can assign a higher priority to super arc 208 so that pre-CTS circuit optimization tries to improve timing of super arc 208 (i.e., tries to increase the timing slack regardless of whether the current timing slack value is negative or positive) before it tries to resolve the timing violations in other super arcs. Note that within super arc 208, the pre-CTS circuit optimization process is free to decide the order in which to size gates to improve timing. Note that none of the conventional circuit optimization techniques use the super path slack to determine an order in which to optimize super arcs.

One assumption that has been made in the above discussion is that as long as the super path slack is greater than or equal to zero, there is a useful skew scheduling solution to make each individual path in the super path have its slack greater than or equal to zero also. However, in reality, there are several restrictions that void this assumption and they are now discussed.

The delaying of a sequential circuit element's clock latency due to useful skew should not exceed the insertion delay of the clock, otherwise we may end up inserting too many buffers on the clock tree, and the on-chip variation effect (which is more severe with longer insertion delay) can undo the benefits that were obtained by introducing the useful skew.

Figure 3A:
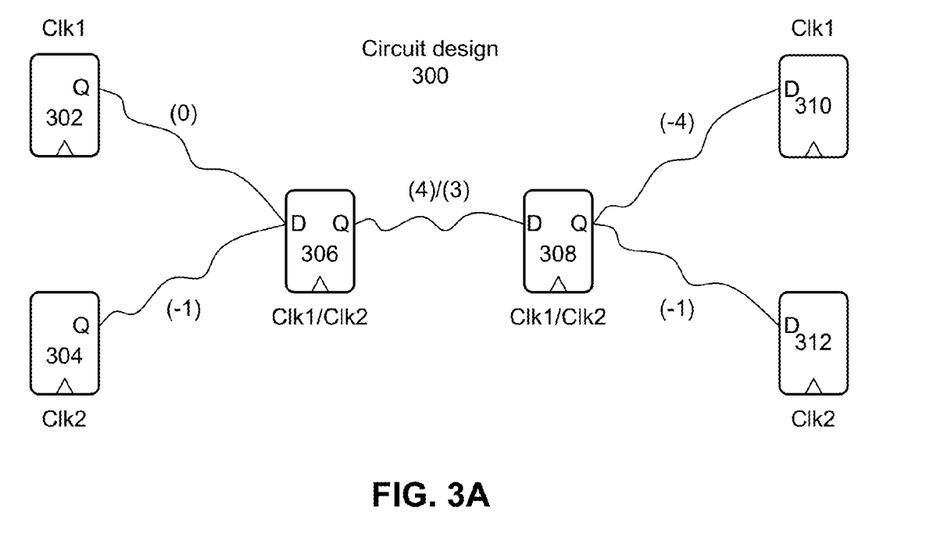
FIGS. 3A-3B illustrate an example in which a sequential circuit element is clocked using multiple clocks in accordance with some embodiments described herein.
Figure 3B:
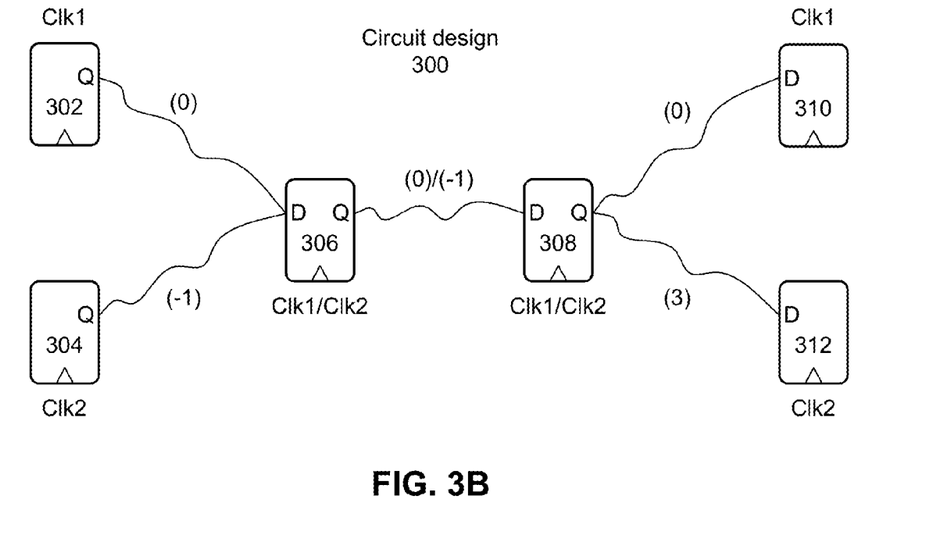

When a sequential circuit element is clocked using multiple clocks, there will be multiple slacks for each path (each pair of launching and capturing flops) due to different clocks, and the useful skew scheduling is not independent for each clock. FIGS. 3A-3B illustrate an example in which a sequential circuit element is clocked using multiple clocks in accordance with some embodiments described herein. Circuit 300 includes sequential circuit elements 302, 304, 306, 308, 310, and 312 that are interconnected by paths (curved lines) as shown in FIG. 3A. The number in brackets next to each path is the slack on that path. The path between sequential circuit elements 306 has 308 has two numbers next to it. The first number "(4)" is the slack in Clk1, and the second number "(3)" is the slack in Clk2.

In FIG. 3A, let us assume that all paths between Clk1 and Clk2 are false paths. A false path is a path for which timing violations are to be ignored. For example, the timing of the path that begins at sequential circuit element 302 (clock domain Clk1) and ends at sequential circuit element 312 (clock domain Clk2) can be ignored.

Now, if we look at the path from sequential circuit element 304 to sequential circuit element 312 on its own, it seems as if we should be able to achieve non-negative slacks by using useful skew. However, the useful skew scheduling of Clk2 paths is affected by that of Clk1 which is more timing critical, and as a result there are still negative slacks remaining on the Clk2. Specifically, if we try to remove the timing violation on the Clk2 path by using useful skew, it will cause a timing violation to occur on the Clk1 path. FIG. 3B illustrates the slacks after useful skew has been used to resolve the negative slack on the path between sequential circuit element 304 and 310. Therefore, even though it is possible to use useful skew to resolve timing violations on two different paths when they are considered independently, it may not be possible to use useful skew to resolve the timing violations on both of the path simultaneously because of a dependency between the two paths. Some embodiments can detect situations in which two (or more) super paths are in different clock domains but share one or more super arcs. Once the super paths have been detected, the embodiments can use the useful skew to resolve timing violations in a given clock domain while ensuring that no new timing violations are created in other clock domains.

Figure 4:
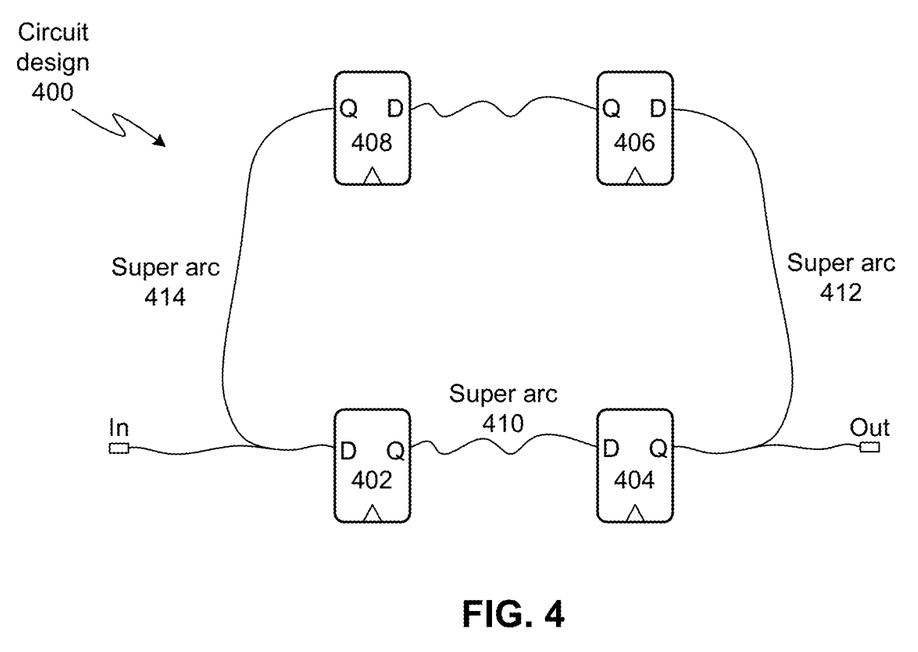
FIG. 4 illustrates a circuit design that includes a loop in accordance with some embodiments described herein.

Another complication occurs when a super path has a loop. FIG. 4 illustrates a circuit design that includes a loop in accordance with some embodiments described herein. Circuit 400 includes sequential circuit element 402, 404, 406, and 408 that are interconnected by paths (curved lines) as shown in FIG. 4. Note that the "Q" output of sequential circuit element 404 is coupled to the "D" input of sequential circuit element 402 via a path that passes through sequential circuit elements 406 and 408, thereby forming a loop.

If the super path slack of the super path between primary input "In" and primary output "Out" is greater than equal to zero, then we should be able to use useful skew to remove any timing violations in the super path. However, this may not be possible because of the loop. Specifically, if we change the relative clock skew between sequential circuit elements 402 and 404 to increase the slack in super arc 410, then that can correspondingly decrease the slack in super arcs 412 and/or 414, which may create a timing violation. For example, suppose the clock edge of sequential circuit element 402 is moved earlier by 1 time unit and the clock edge of sequential circuit element 404 is moved later by 1 time unit, then the slack in super arc 410 will increase by 2 time units. However, the slacks in super arcs 412 and 414 will each decrease by 1 time unit, which may cause a timing violation in super arcs 412 and/or 414.

Some embodiments described herein detect loops (e.g., by performing a breadth-first traversal and keeping track of nodes that were visited), and determine super paths with positive slacks that are affected by the detected loops. For the affected super paths, the embodiments can determine if useful skew can be used to resolve timing violations in the super path.

Note that the super path computation can be separated from the pre-CTS circuit optimization engine, and can potentially be shared/combined with the useful skew computation engine. Note that the super path computation provides guidance to the pre-CTS circuit optimization engine, namely, the super path computation provides guidance as to which paths to optimize and when to stop the optimization.

For example, in some embodiments, the pre-CTS circuit optimization engine can be instructed to stop optimization once all super paths have positive slack even if individual path slacks are still negative. The timing violations of the negative path slacks can then be resolved using useful skew during CTS. This can greatly reduce the amount of optimization that needs to be done by the pre-CTS circuit optimization engine compared to the traditional approach since it allows many paths to have negative slacks as long as the super paths have non-negative slacks. This is an important insight that is used by some embodiments to drastically reduce the amount of optimization that needs to be performed by the pre-CTS circuit optimization engine.

Figure 5:
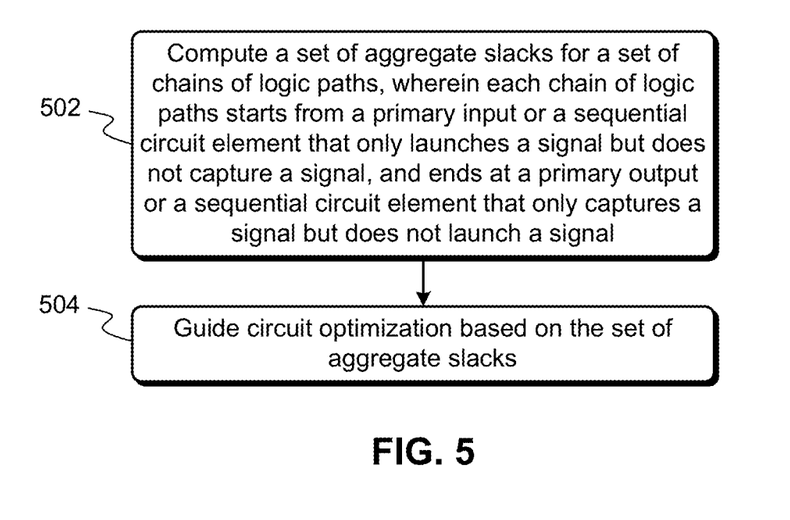
FIG. 5 illustrates a process for computing and using super path slacks in accordance with some embodiments described herein.

FIG. 5 illustrates a process for computing and using super path slacks in accordance with some embodiments described herein. The process can begin by computing a set of aggregate slacks (i.e., super path slacks) for a set of chains of logic paths, wherein each chain of logic paths starts from a primary input or a sequential circuit element that only launches a signal but does not capture a signal, and ends at a primary output or a sequential circuit element that only captures a signal but does not launch a signal (operation 502). Next, the process can guide circuit optimization based on the set of aggregate slacks (operation 504). Note that the set of aggregate slacks can include one or more aggregate slacks, and the set of chains of logic paths can include one or more chains of logic paths.

Specifically, if the aggregate slack is greater than or equal to zero, then the process can instruct the pre-CTS circuit optimization engine to not try to resolve timing errors on logic paths that are in the super path. On the other hand, if the aggregate slack is negative, then the process can instruct the pre-CTS circuit optimization engine to try to increase the timing slack of logic paths that are in the super path.

In some embodiments, the process can prioritize logic paths based on the number of super paths with negative slack that pass through a logic path. Specifically, a logic path has a higher priority if it is shared by greater number of super paths with negative slacks. Next, the process can guide the pre-CTS circuit optimization engine to increase timing slack of logic paths in decreasing priority order. In a variation, the priority of a logic path can be based on the sum of the magnitudes of the negative slacks of the super paths that include the logic path. In yet another variation, if two logic paths have the same priority, then the slack of the logic paths can be used to break the tie. Specifically, the logic path with the lower timing slack can be given higher priority than the logic path with the higher timing slack.

In some embodiments, the process can instruct the pre-CTS optimization engine to terminate optimization when all aggregate slacks in the set of aggregate slacks are greater than or equal to zero (i.e., even if the slacks of one or more logic paths are negative).

Computer System

Figure 6:
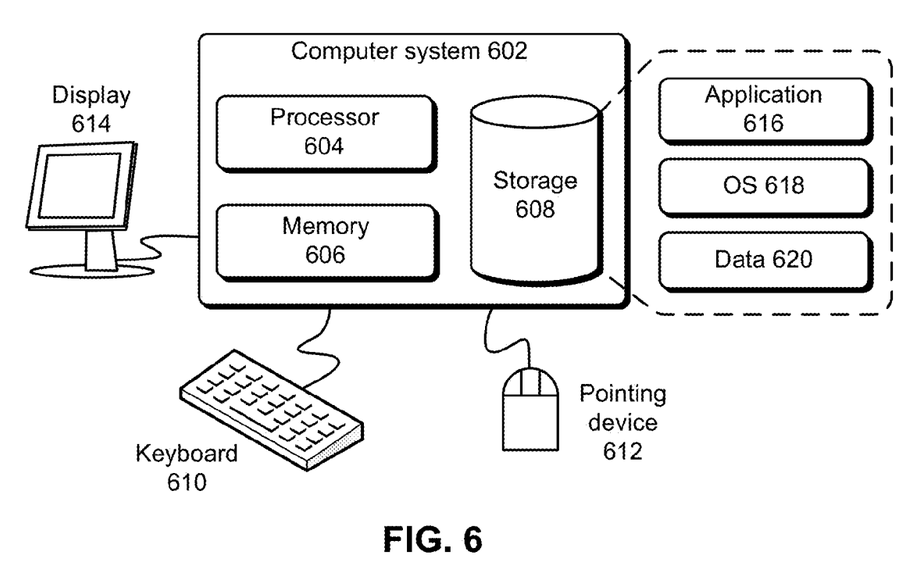
FIG. 6 illustrates a computer system in accordance with some embodiments described herein.

FIG. 6 illustrates a computer system in accordance with some embodiments described herein. A computer system can generally be any system that can perform computations. Specifically, a computer system can be a microprocessor, an application specific integrated circuit, a distributed computing system, a cloud computing system, or any other computing system now known or later developed. Computer system 602 comprises processor 604, memory 606, and storage 608. Computer system 602 can be coupled with display 614, keyboard 610, and pointing device 612. Storage 608 can generally be any device that can store data. Specifically, a storage device can be a magnetic, an optical, or a magneto-optical storage device, or it can be based on flash memory and/or battery-backed up memory. Storage 608 can store application 616, operating system 618, and data 620.

Application 616 can include instructions that when executed by computer 602 cause computer 602 to perform one or more processes that are implicitly or explicitly described in this disclosure. Data 620 can include any data that is inputted into or outputted by application 616.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. In an electronic design automation (EDA) tool in a computer, a method for guiding circuit optimization, the method comprising:

the EDA tool in the computer computing a set of aggregate slacks for a set of chains of logic paths in a circuit design, wherein each aggregate slack in the set of aggregate slacks corresponds to a chain of logic paths in the set of chains of logic paths, wherein each logic path in each chain of logic paths (1) begins at a primary input or an output of a sequential circuit element and (2) ends at a primary output or an input of a sequential circuit element, wherein each aggregate slack in the set of aggregate slacks is equal to a sum of slacks of individual logic paths in the corresponding chain of logic paths in the set of chains of logic paths;

the EDA tool in the computer determining an optimization guidance based on the set of aggregate slacks, wherein the optimization guidance comprises one or more of: (1) a specification of one or more timing violations that are not to be resolved, (2) a specification of one or more timing violations that are to be resolved, (3) a specification of one or more aggregate slacks that are to be increased, (4) a specification of an order in which chains of logic paths are to be optimized, (5) a specification of an order in which logic paths are to be optimized, and (6) a specification of a termination condition for terminating a circuit optimization; and the EDA tool in the computer optimizing the circuit design based on the optimization guidance.

2. The method of claim 1, wherein the specification of one or more timing violations that are not to be resolved comprises a specification of a timing violation of a logic path that is in a chain of logic paths, wherein the aggregate slack corresponding to the chain of logic paths is greater than or equal to zero.

3. The method of claim 1, wherein the specification of one or more timing violations that are to be resolved comprises a specification of a timing violation of a logic path that is in a chain of logic paths, wherein the aggregate slack corresponding to the chain of logic paths is negative.

4. The method of claim 1, wherein the specification of one or more aggregate slacks that are to be increased comprises a specification of a chain of logic paths, wherein the aggregate slack corresponding to the chain of logic paths is negative.

5. The method of claim 1, wherein the specification of an order in which logic paths are to be optimized comprises a prioritization of logic paths based on how many chains of logic paths having negative slack include a given logic path.

6. The method of claim 1, wherein the specification of a termination condition for terminating circuit optimization comprises a termination condition that terminates circuit optimization when all aggregate slacks in the set of aggregate slacks are greater than or equal to zero.

7. A non-transitory computer-readable storage medium storing instructions of an electronic design automation (EDA) tool that, when executed by a computer, cause the computer to perform a method for guiding circuit optimization, the method comprising:

the computer computing a set of aggregate slacks for a set of chains of logic paths in a circuit design, wherein each aggregate slack in the set of aggregate slacks corresponds to a chain of logic paths in the set of chains of logic paths, wherein each path in each chain of logic paths (1) begins at a primary input or an output of a sequential circuit element and (2) ends at a primary output or an input of a sequential circuit element, wherein each aggregate slack in the set of aggregate slacks is equal to a sum of slacks of individual logic paths in the corresponding chain of logic paths in the set of chains of logic paths;

the computer determining an optimization guidance based on the set of aggregate slacks, wherein the optimization guidance comprises one or more of: (1) a specification of one or more timing violations that are not to be resolved, (2) a specification of one or more timing violations that are to be resolved, (3) a specification of aggregate slacks that are to be increased, (4) a specification of an order in which chains of logic paths are to be optimized, (5) a specification of an order in which logic paths are to be optimized, and (6) a specification of a termination condition for terminating a circuit optimization; and the computer optimizing the circuit design based on the optimization guidance.

8. The non-transitory computer-readable storage medium of claim 7, wherein the specification of one or more timing violations that are not to be resolved comprises a specification of a timing violation of a logic path that is in a chain of logic paths, wherein the aggregate slack corresponding to the chain of logic paths is greater than or equal to zero.

9. The non-transitory computer-readable storage medium of claim 7, wherein the specification of one or more timing violations that are to be resolved comprises a specification of a timing violation of a logic path that is in a chain of logic paths, wherein the aggregate slack corresponding to the chain of logic paths is negative.

10. The non-transitory computer-readable storage medium of claim 7, wherein the specification of one or more aggregate slacks that are to be increased comprises a specification of a chain of logic paths, wherein the aggregate slack corresponding to the chain of logic paths is negative.

11. The non-transitory computer-readable storage medium of claim 7, wherein the specification of an order in which logic paths are to be optimized comprises a prioritization of logic paths based on how many chains of logic paths having negative slack include a given logic path.

12. The non-transitory computer-readable storage medium of claim 7, wherein the specification of a termination condition for terminating circuit optimization comprises a termination condition that terminates circuit optimization when all aggregate slacks in the set of aggregate slacks are greater than or equal to zero.

13. An apparatus, comprising:
a processor; and
a non-transitory storage medium storing instructions of an electronic design automation (EDA) tool that, when executed by the processor, cause the apparatus to perform a method for guiding circuit optimization, the method comprising:
the apparatus computing a set of aggregate slacks for a set of chains of logic paths in a circuit design, wherein each aggregate slack in the set of aggregate slacks corresponds to a chain of logic paths in the set of chains of logic paths, wherein each logic path in each chain of logic paths (1) begins at a primary input or an output of a sequential circuit element and (2) ends at a primary output or an input of a sequential circuit element, wherein each aggregate slack in the set of aggregate slacks is equal to a sum of slacks of individual logic paths in the corresponding chain of logic paths in the set of chains of logic paths;
the apparatus determining an optimization guidance based on the set of aggregate slacks, wherein the optimization guidance comprises one or more of: (1) a specification of one or more timing violations that are not to be resolved, (2) a specification of one or more timing violations that are to be resolved, (3) a specification of one or more aggregate slacks that are to be increased, (4) a specification of an order in which chains of logic paths are to be optimized, (5) a specification of an order in which logic paths are to be optimized, and (6) a specification of a termination condition for terminating a circuit optimization; and
the apparatus optimizing the circuit design based on the optimization guidance.

14. The apparatus of claim 13, wherein the specification of one or more timing violations that are not to be resolved comprises a specification of a timing violation of a logic path that is in a chain of logic paths, wherein the aggregate slack corresponding to the chain of logic paths is greater than or equal to zero.

15. The apparatus of claim 13, wherein the specification of one or more timing violations that are to be resolved comprises a specification of a timing violation of a logic path that is in a chain of logic paths, wherein the aggregate slack corresponding to the chain of logic paths is negative.

16. The apparatus of claim 13, wherein the specification of one or more aggregate slacks that are to be increased comprises a specification of a chain of logic paths, wherein the aggregate slack corresponding to the chain of logic paths is negative.

17. The apparatus of claim 13, wherein the specification of an order in which logic paths are to be optimized comprises a prioritization of logic paths based on how many chains of logic paths having negative slack include the logic path, wherein the circuit optimization attempts to increase timing slacks of logic paths in decreasing priority order.

18. The apparatus of claim 13, wherein the specification of a termination condition for terminating circuit optimization comprises a termination condition that terminates circuit optimization when all aggregate slacks in the set of aggregate slacks are greater than or equal to zero.

19. The method of claim 1, wherein the circuit design is subsequently provided to a semiconductor fabrication facility for fabrication.

20. The non-transitory computer-readable storage medium of claim 7, wherein the circuit design is subsequently provided to a semiconductor fabrication facility for fabrication.

21. The apparatus of claim 13, wherein the circuit design is subsequently provided to a semiconductor fabrication facility for fabrication.

* * * * *